United States Patent [19]

Barclay et al.

[11] Patent Number: 5,182,914
[45] Date of Patent: Feb. 2, 1993

[54] ROTARY DIPOLE ACTIVE MAGNETIC REGENERATIVE REFRIGERATOR

[75] Inventors: John A. Barclay; Joseph A. Waynert; Anthony J. DeGregoria; Joseph W. Johnson; Peter J. Claybaker, all of Madison, Wis.

[73] Assignee: Astronautics Corporation of America, Milwaukee, Wis.

[21] Appl. No.: 493,339

[22] Filed: Mar. 14, 1990

[51] Int. Cl.$^5$ .................... F25B 21/00; F25B 9/00; H01F 5/08; H01F 7/22
[52] U.S. Cl. .................................. 62/3.1; 62/6; 505/889; 505/891; 505/892; 505/894; 505/895; 505/896; 505/897; 505/898; 505/899
[58] Field of Search .................. 62/6, 3.1; 505/889, 505/891, 892, 894, 895, 896, 897, 898, 899

[56] References Cited

U.S. PATENT DOCUMENTS

| 2,510,800 | 6/1950 | Chilowsky | 310/306 |
|---|---|---|---|
| 2,619,603 | 11/1952 | Chilowsky | 310/306 |
| 2,648,784 | 8/1953 | Chilowsky | 310/306 |
| 3,108,444 | 10/1963 | Kahn | 62/3.1 |
| 3,121,265 | 2/1964 | Hoh | 49/24 |
| 3,393,526 | 7/1968 | Pearl | 62/3.1 |
| 3,413,814 | 12/1968 | Van Geuns | 62/3.1 |
| 3,743,866 | 7/1973 | Pire | 310/306 |
| 3,774,404 | 11/1973 | Walker et al. | 62/3.1 |
| 3,841,107 | 10/1974 | Clark | 62/3.1 |
| 4,033,734 | 7/1977 | Steyert, Jr. et al. | 62/3.1 |
| 4,069,028 | 1/1978 | Brown | 62/3.1 |
| 4,107,935 | 8/1978 | Steyert, Jr. | 62/3.1 |
| 4,332,135 | 6/1982 | Barclay et al. | 62/3.1 |
| 4,408,463 | 10/1983 | Barclay et al. | 62/3.1 |

(List continued on next page.)

OTHER PUBLICATIONS

H. Nakagome, et al., "A Parasitic Magnetic Refrigerator for Cooling Superconduction Magnet," IEEE Transactions on Magnetics, vol. 24, No. 2, Mar. 1988, pp. 1113-1116.
Y. Hakuraku, et al., "Conceptual Design of a New Magnetic Refrigerator Operating Between 4K and 20K," Japanese Journal of Applied Physics, vol. 24, No. 11, Nov., 1985, pp. 1548-1551.
Magnetic Refrigeration: The Basis for a New Refrigeration Technolog Los Alamos Laboratory Mini-Review, LALP-82-34, Nov., 1982.

(List continued on next page.)

Primary Examiner—Harvey E. Behrend
Assistant Examiner—Daniel Jenkins
Attorney, Agent, or Firm—Foley & Lardner

[57] ABSTRACT

The rotary dipole active magnetic regenerative refrigerator (10) of the present invention comprises a stationary first regenerative magnetic bed (12) positioned within a stationary first inner dipole magnet (14), a stationary second regenerative magnetic material bed (16) positioned within a stationary second inner dipole magnet (18), an outer dipole magnet (20) that rotates on a longitudinal axis and encloses the inner dipole magnets (14, 18), a cold heat exchanger (22), hot heat exchangers (24, 26), a fluid displacer (28), and connective plumbing through which a heat transfer fluid is conveyed. The first and second regenerative magnetic beds (12, 16) are magnetized and demagnetized as the vector sums of the magnetic fields of the inner dipoles magnets (14, 18) and the outer dipole magnet (20) are added together upon rotation of the outer dipole magnet (20), such magnetization and demagnetization causing a correlative increase and decrease in the temperature of the magnetic material beds (12, 16) by the magnetocaloric effect. Upon magnetization of any particular magnetic material bed (12 or 16), fluid flow is forced therethrough in the connective plumbing by the fluid displacer (28) in the direction from the cold heat exchanger (22) to one of the hot heat exchangers (24,26). Upon demagnetization of any particular magnetic material bed (12 or 16), fluid flow is reversed by the fluid displacer (28) and is forced in the direction from one of the hot heat exchangers (24, 26) to the cold heat exchanger (22).

38 Claims, 5 Drawing Sheets

U.S PATENT DOCUMENTS

| | | | |
|---|---|---|---|
| 4,441,325 | 4/1984 | Bon-Mardion et al. | 62/3.1 |
| 4,457,135 | 7/1984 | Hakuraku et al. | 62/3.1 |
| 4,459,811 | 7/1984 | Barclay et al. | 62/3.1 |
| 4,464,903 | 8/1984 | Nakagome et al. | 62/3.1 |
| 4,507,927 | 4/1985 | Barclay | 62/467 |
| 4,507,928 | 4/1985 | Johnson | 62/3.1 |
| 4,599,866 | 7/1986 | Nakagome et al. | 62/3.1 |
| 4,642,994 | 2/1987 | Barclay et al. | 62/3.3 |
| 4,702,090 | 10/1987 | Barclay et al. | 62/3.3 |
| 4,704,871 | 11/1987 | Barclay et al. | 62/3.1 |
| 4,901,047 | 2/1990 | Wipf | 335/216 |

OTHER PUBLICATIONS

J. A. Barclay, et al., "Experimental Results on a Low Temperature Magnetic Refrigerator," Adv. in Cryogenic Engineering 31, 743 (1986).

Y. Hakuraku, et al., "A Magnetic Refrigerator for Superfluid Helium Equipped with a Rotating Magnetic System," Japanese Journal of Applied Physics, vol. 25, No. 1, Jan., 1986, pp. 140-146.

Y. Hakuraku, et al., "A Rotary Magnetic Refrigerator for Superfluid Helium Production", J. Appl. Phys. 60 (9), Nov. 1, 1986, pp. 3226-3268.

J. A. Barclay, et al., "Magnetic Refrigeration for 4-20K Application" Los Alamos National Laboratory Report LA UR-84-540, Dec., 1983.

Flight Dynamics Laboratory, Air Force Wright Aeronautical Laboratory Report AFWAL-TR-83-3210, Air Force Systems Command Wright-Patterson Air Force Base, Ohio, 54533 (this report is subject to export control laws).

H. Nakagome et al., "Rotating Magnetic Refrigerator for Helium Liquefaction," Proceedings fo the 11th International Cryogenic Engineering Conference, Berlin, Germany, Apr. 22-25, 1986.

ROTARY DIPOLE ACTIVE MAGNETIC REGENERATIVE REFRIGERATOR

FIELD OF THE INVENTION

This invention pertains generally to the field of heat transfer and refrigeration apparatus and particularly to magnetic refrigerators of the regenerative type.

BACKGROUND OF THE INVENTION

At present, refrigeration systems, including those for cryogenic applications, are almost entirely based on compression and expansion cycles of a gas. Generally, the efficiency of practical gas cycle refrigerators is only a fraction of the ideal Carnot efficiency, and the efficiency generally decreases with a decrease in the size of the refrigerator. The efficiency of gas cycle refrigerators is particularly low at cryogenic temperatures, e.g., in the 2 K. to 20 K. range. Reliability can also be a problem with large refrigeration systems operating to about 2 K.

It has long been known that certain magnetic materials exhibit the magnetocaloric effect: they increase in temperature when placed in a magnetic field and decrease in temperature when removed from the field. Application of a magnetic field to such solid magnetic materials is analogous to compressing a gas (producing an increase in temperature) and removing the field is analogous to expanding a gas (producing a decrease in temperature). Thus, it has been recognized that a thermodynamic refrigeration cycle can be achieved using a magnetic material as the working material in a manner analogous to the refrigeration cycles of a gas. Refrigerators utilizing the magnetocaloric effect require several essential components. A magnetic material that exhibits a magnetocaloric effect suited to the intended operating temperature range is the refrigerator's working material. Magnets of sufficient field strength to produce the necessary field changes at the working material are required. Means for effecting the necessary cyclic changes in magnetic field at the working material must be included. Switches enabling heat transfer and heat transfer modes to transfer heat to and from the working material at requisite locations within the refrigerator are necessary. A thermal source from which heat is extracted is necessary, as is a sink to which heat is rejected. Finally, a structure with appropriate thermal, magnetic, and physical properties to support the essential elements of the refrigerator with minimum negative performance impact must be included. Examples of relatively recent designs proposed for magnetic refrigerators are shown in U.S. Pat. Nos. 4,033,734, 4,069,028, 4,107,935, 4,332,135, 4,392,356, 4,408,463, 4,441,325, 4,457,135, 4,459,811, 4,464,903, 4,507,927, 4,507,928, and 4,702,090.

A common configuration of magnetic refrigerators is to have the magnetic material attached to or shaped like a wheel, ring, piston, or the like, and cyclically move the magnetic material through a stationary magnetic field of alternating strength to alternately magnetize and demagnetize the magnetic material. For high efficiency, excellent heat transfer between the magnetic material and the heat transfer fluid is required. This usually means the magnetic material must be in a geometry which has large surface area. The magnetic material is often closely toleranced to move through and connect with the thermal source and the heat sink for the necessary heat transfer toward and away from the magnetic refrigerator. The magnetic material is sometimes shaped to include fins for increased heat transfer performance, thus making the required high tolerances even more difficult to achieve. Magnetic refrigerators typically have a number of moving parts, require moving parts in the area of heat transfer fluid, and the magnetic material requires close tolerances. Though these problems are not insurmountable, they may require fastidious attention in the design and fabrication of the magnetic refrigerator.

An alternate approach that has been suggested is to employ a fixed magnetic regenerative bed in which the magnetization and demagnetization is accomplished by using charge/discharge magnets. However, such charge/discharge magnets have been found to compromise the overall efficiency of the magnetic refrigerator.

SUMMARY OF THE INVENTION

The magnetic refrigerator described herein is a rotary dipole active magnetic regenerative refrigerator and comprises a stationary first regenerative magnetic material bed positioned within a stationary first inner dipole magnet, a stationary second regenerative magnetic material bed positioned within a stationary second inner dipole magnet, an outer dipole magnet that is rotatably mounted on a low tolerance bearing on a longitudinal axis and that encloses the inner dipole magnets, a cold heat exhanger, hot heat exchangers, a fluid displacer, and connective plumbing necessary to effect the necessary heat transfer. The magnetic fields necessary to create the magnetocaloric effect are produced by the inner and outer dipole magnets and such fields are oriented transverse to the longitudinal axis. The first and second regenerative magnetic beds are magnetized and demagnetized as the vector sums of the magnetic fields of the inner dipole magnets and the outer dipole magnet are added together upon rotation of the outer dipole magnet. When the magnetic fields of one of the inner and outer dipole magnets align, the fields will be added to create a peak magnetic field. Upon one-half rotation of the outer dipole magnet, the fields of one of the inner and outer dipoles are anti-aligned to cause the magnetic fields to essentially cancel each other.

The two inner dipole magnets are connected in opposition so that the field produced by one is in the opposite direction to that of the other. Therefore, when the outer dipole magnet aligns with the field of the first inner dipole magnet, the outer dipole magnet is simultaneously cancelling the field of the second inner dipole magnet. Thus, one of the two particle beds is rejecting heat to the hot sink while the other is absorbing heat from the cold source. Such heat transfer is accomplished by the piping, which conveys a heat transfer fluid through the magnetic regenerative beds and to and from the hot and cold heat exhangers.

The fluid displacer forces flow of the heat transfer fluid within the piping. The rotation of the outer dipole magnet causes successive magnetization and demagnetization of the regenerative magnetic material beds, and a correlative increase and decrease of the temperature of the beds. Upon magnetization of any particular bed, fluid flow is forced therethrough in the direction from the cold heat exchanger to one of the hot heat exchangers. Upon demagnetization of any particular bed, fluid flow is reversed and forced therethrough in the direction from one of the hot heat exchangers to the cold heat exchanger. Fluid flow through the piping is therefore reciprocated by the fluid displacer.

The rotary dipole active magnetic refrigerator of the present invention reduces the number of high precision moving parts as compared to those magnetic refrigerators in which the magnetic material is cyclically moved through a magnetic field of varying intensity, removes all moving parts from the area of interaction of the heat transfer fluid and the magnetic material, and involves no close tolerances in the design in that the bearing of the outer dipole may be of low tolerance. Further, the present invention avoids the inefficiencies associated with the charge/discharge magnets in those designs that utilize a stationary magnetic bed.

Further objects, features, and advantages of the present invention will be apparent from the following detailed description when taken in conjunction with the accompanying drawings.

DETAILED DESCRIPTION OF THE PREFERRED EMBODIMENT

Figure 1:
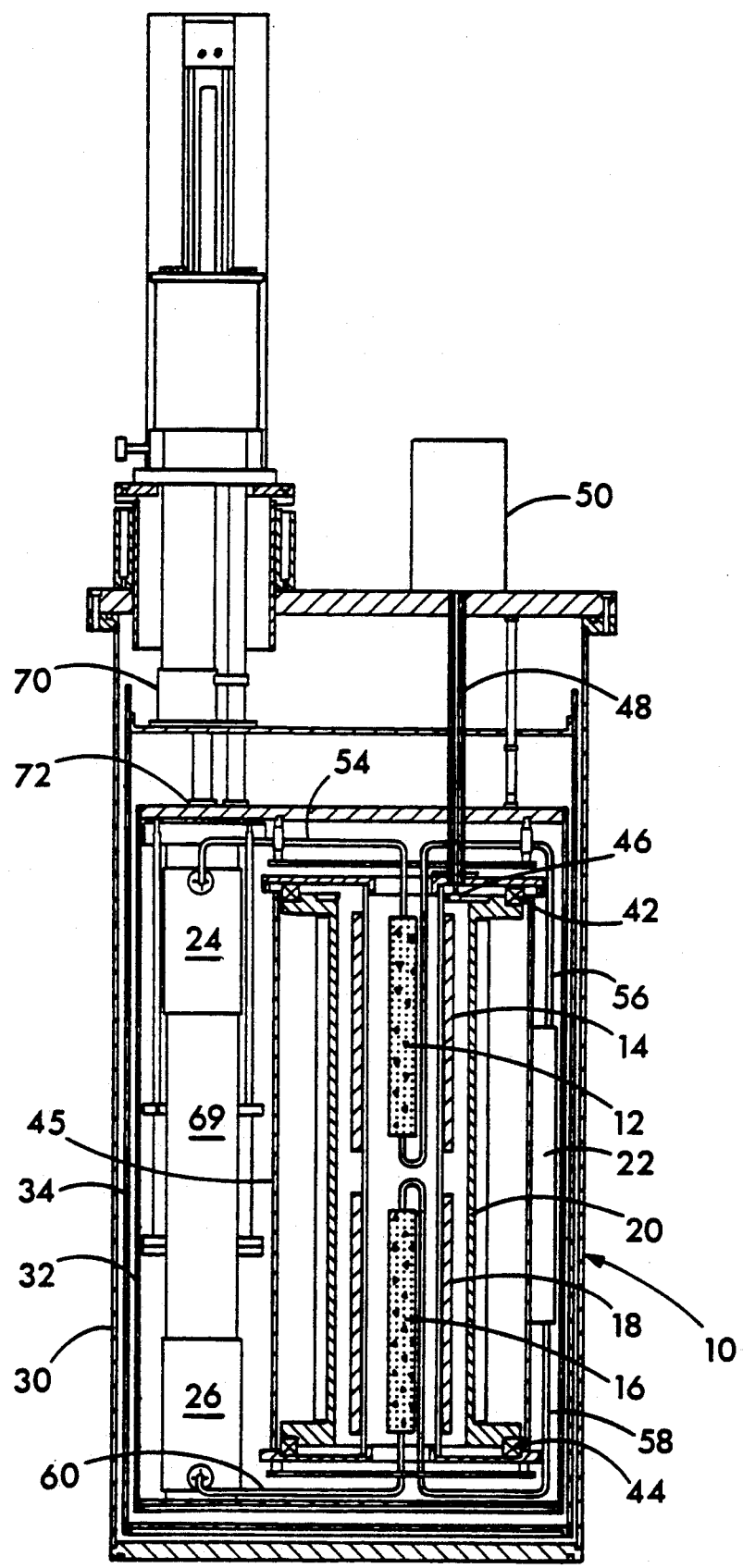
FIG. 1 is a front cross-section view through the vacuum vessel and the rotary dipole active magnetic refrigerator of the present invention.
Figure 2:
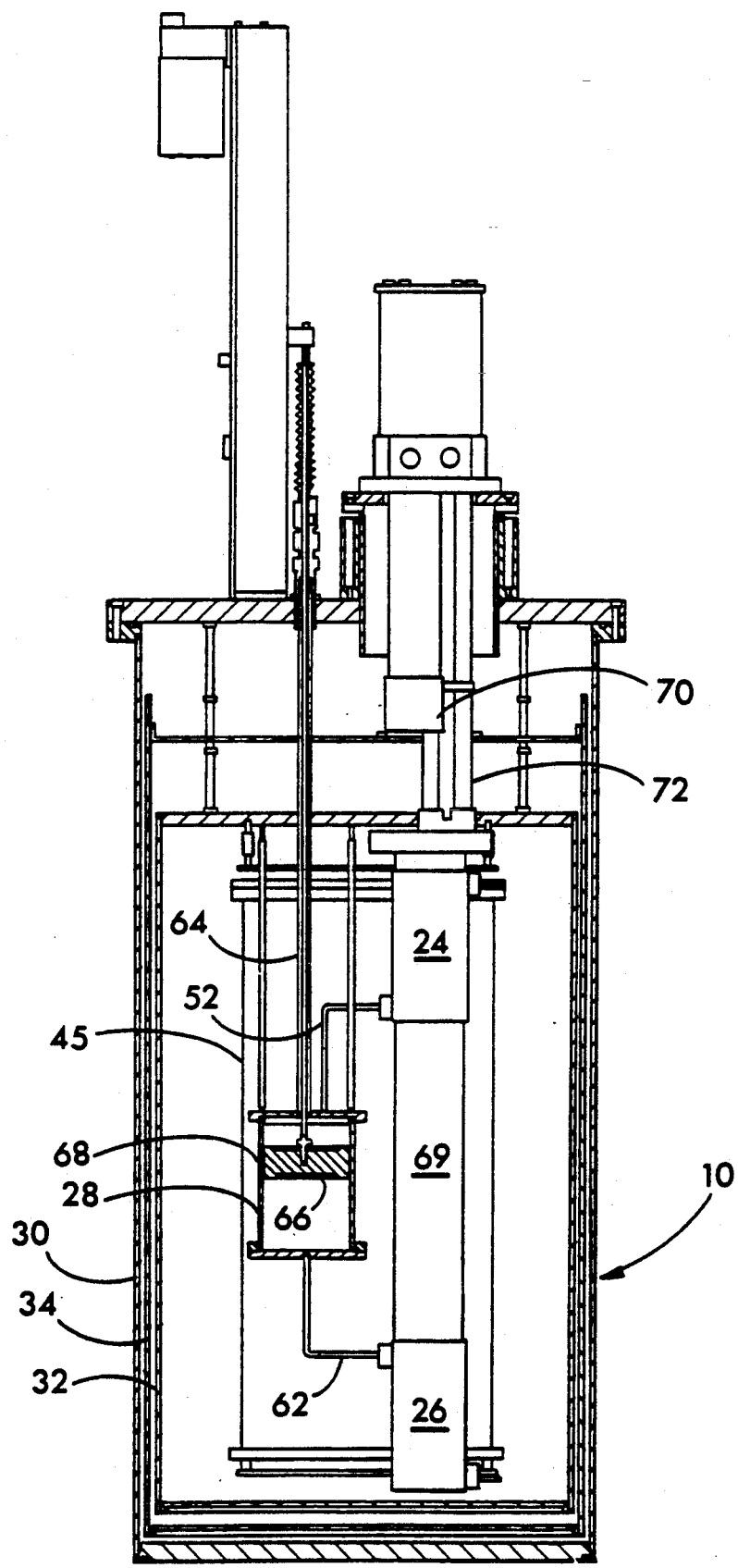
FIG. 2 is a side cross-section view through the vacuum vessel and the rotary dipole active magnetic refrigerator of the present invention.
Figure 3:
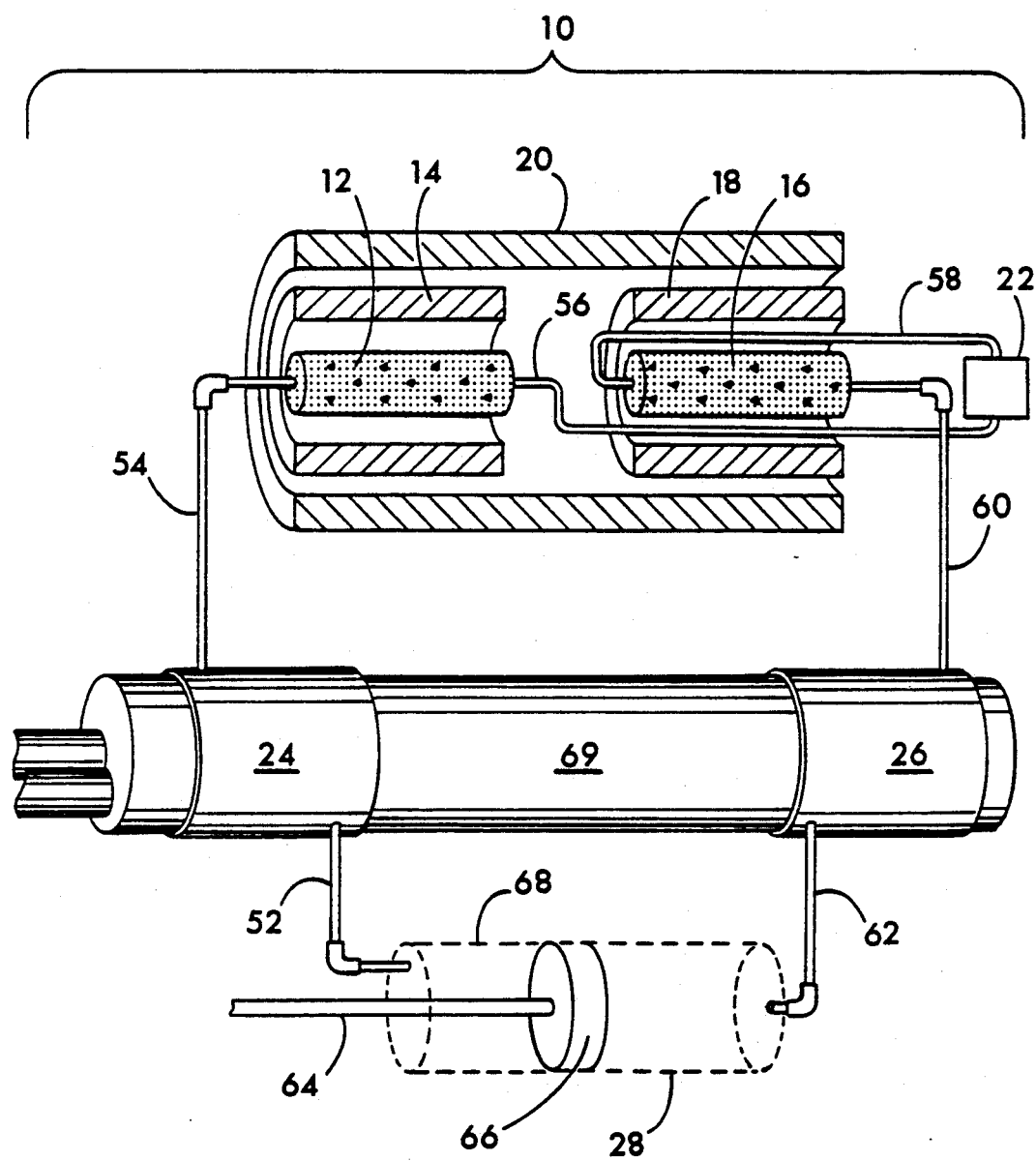
FIG. 3 is a partially schematic representation of the rotary dipole active magnetic refrigerator of the present invention.

With reference to the drawings, FIGS. 1, 2, and 3 show a rotary dipole active magnetic regenerative refrigerator of the present invention at 10. The rotary dipole active magnetic regenerative refrigerator 10 comprises a first regenerative magnetic material bed 12 positioned within a first inner dipole magnet 14, a second regenerative magnetic material bed 16 positioned within a second inner dipole magnet 18, a rotatable outer dipole magnet 20 which encloses the inner dipole magnets 14 and 18, a cold heat exchanger 22, hot heat exchangers 24 and 26, a fluid displacer 28, and appropriate connective plumbing. The magnetic refrigerator 10 as herein described is constructed to provide cooling at low temperatures from about 20-30 K. down to 4 K., although with certain modifications, as later described, the magnetic refrigerator 10 may provide cooling at intermediate and near room temperatures.

The magnetic refrigerator 10 will have its structural parts thereof encased in a vacuum vessel 30 and cooled to cryogenic temperatures. The vacuum vessel 30 encompasses thermal shields 32 and 34 formed, for example, of copper or aluminum preferably covered with layers of metal coated plastic or superinsulation. The magnetic refrigerator 10 is encased within the thermal shield 32; the thermal shield 32 fits within the thermal shield 34; and the thermal shield 34 fits within the vacuum vessel 30. The voids between each of the shields 32 and 34, and the vacuum vessel 30 are evacuated to form an insulating dewar. FIG. 1 represents one of a number of possible configurations of the vacuum vessel 30 and surrounding shields. Though the magnetic refrigerator 10 is depicted having a vertical orientation it is noted that the magnetic refrigerator 10 will operate in any orientation.

The magnetic refrigerator 10 utilizes the magnetocaloric effect, by which certain magnetic materials increase in temperature when placed in a magnetic field and decrease in temperature when removed from the field. The regenerative magnetic beds 12 and 16 are composed of magnetic material or a blend of magnetic materials that is subject to the magnetocaloric effect and correspondingly increases in temperature when placed in a magnetic field and decreases in temperature when removed from the field. Rare earth intermetallic compounds that have ferromagnetic properties are preferable materials for the regenerative beds 12 and 16. The specific material choice for the beds 12 and 16 may be dictated by the specific temperatures at which the magnetic refrigerator 10 is intended to be run. Exemplary materials for low temperature applications include $Er_xGd_{1-x}Al_2$, $DyAl_2$, $GdPd$, $GdNi$, and $ErNi$, or combinations thereof. Certain transition metals may also be suitable for use as a material for the beds 12 and 16. Though the drawings represent the magnetic beds 12 and 16 to be cylindrical in shape, alternate geometries may be used and should be considered within the scope of the present invention. The magnetic beds 12 and 16 are stationary.

Figures 4A, 4B:
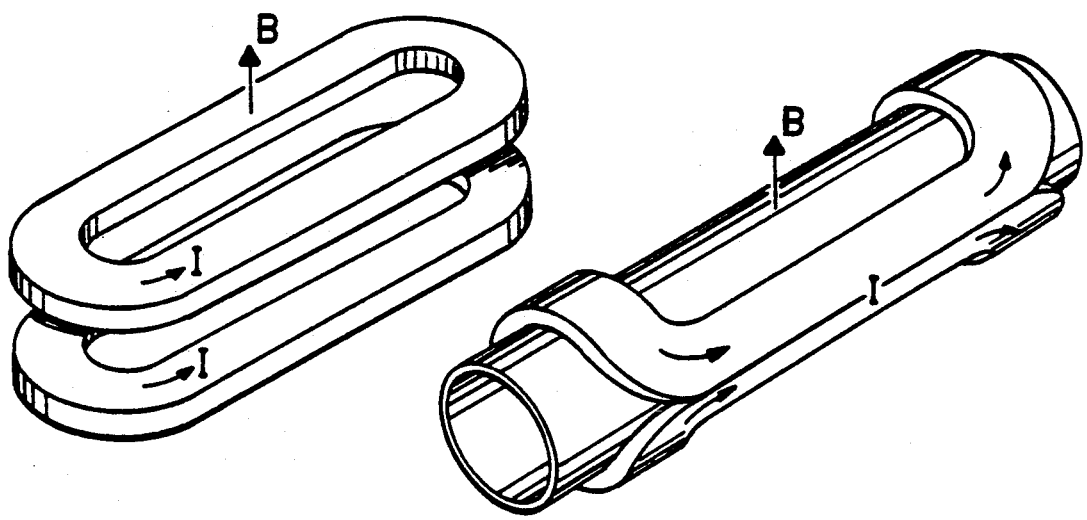
FIG. 4A shows the configuration of race track windings necessary to form a dipole magnet.
FIG. 4B shows the race track windings made to conform to the surface of a cylinder in a saddle-shaped configuration such as is used in the dipole magnets of the present invention.
Figure 5:
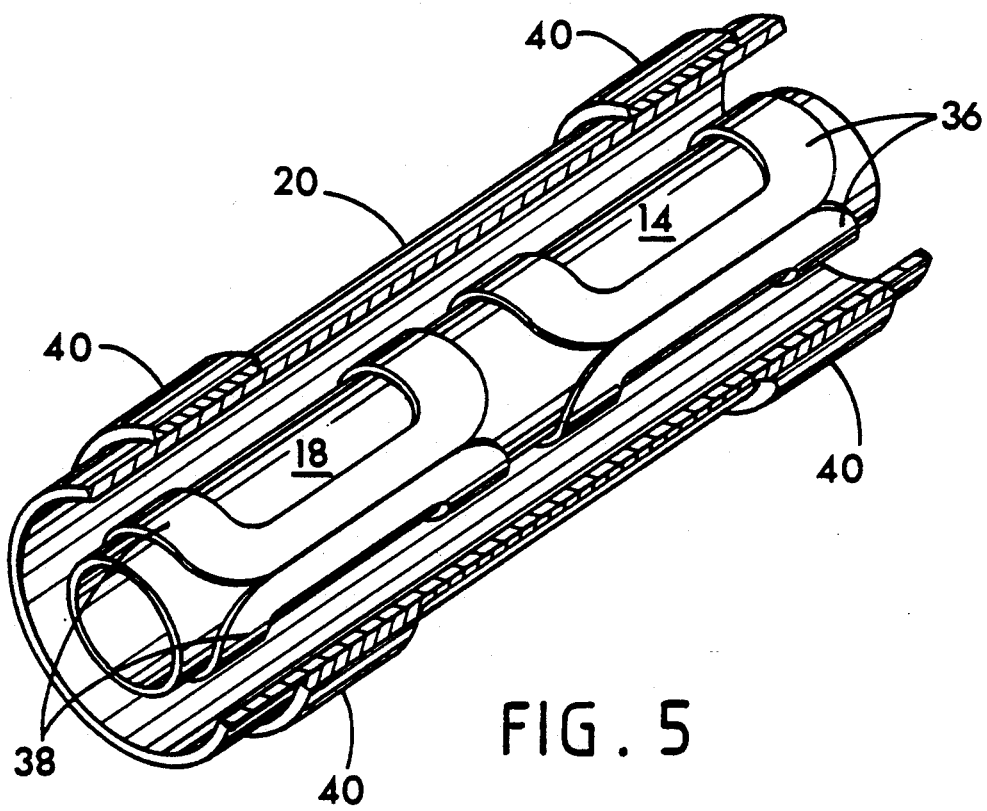
FIG. 5 shows the inner dipoles such as are used in the present invention nested within an outer dipole.
Figure 6:
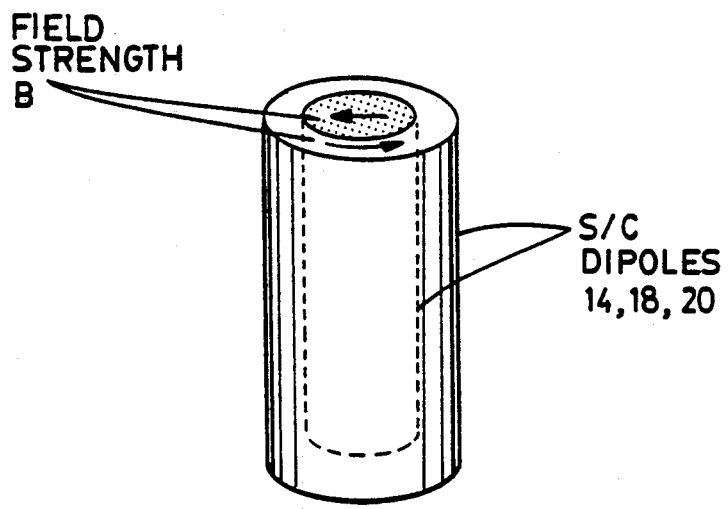
FIG. 6 illustrates the summation of the magnetic field of the inner dipole and the magnetic field of the outer dipole to produce a net magnetic field exerted upon the magnetic material bed positioned within the inner dipole.

The magnetic fields that induce the magnetocaloric effect in the regenerative magnetic beds 12 and 16 are produced by the inner dipole magnets 14 and 18, and the outer dipole magnet 20. A dipole magnet produces a magnetic field transverse to its longitudinal axis of symmetry and is made by winding race-track coils into a saddle-shape to the surface of the cylinder. Transverse fields in magnets are made by winding race-track coils such as shown in FIG. 4A and are called dipole magnets when the windings are saddle-shaped to conform to the surface of a cylinder, as in FIG. 4B. FIG. 5 shows the outer dipole magnet 20 partially cut away to illustrate the inner dipole magnets 14 and 18 nested within. The inner dipole magnet 14 is formed by saddle-shaped windings 36 and the inner dipole magnet 18 is formed by saddle-shaped windings 38. The outer dipole magnet 20 is formed by the saddle-shaped windings 40. Though FIGS. 4A, 4B and 5 do not show individual windings of the dipole magnets, it is to be understood that the windings are oriented along the saddles. The dipole magnets 14 and 18 are connected in series opposition so that if the dipole magnet 18 produces field B vertically upward, the dipole magnet 14 produces a field B vertically downward. For low temperature applications, the windings of the dipole magnets are superconducting. Suitable materials for the superconducting windings are niobium-titanium (NbTi) or niobium-3 tin ($Nb_3Sn$). The inner dipole magnets 14 and 18, and the outer dipole magnet 20 may be immersed within a helium bath contained within a chamber 45. The helium bath of the chamber 45 maintains the dipole magnets 14, 18, and 20 at the necessary superconducting temperatures. The dipole magnets 14, 18, and 20 may also be conduction cooled to avoid liquid cryogen useage.

The inner dipole magnets 14 and 18 are stationary; the outer dipole magnet 20 is mounted for rotation on its longitudinal axis on bearings 42 and 44. The bearings 42 and 44 are preferably dry lubricated and their application does not require high tolerance. Other noncontacting berainings such as magnetic bearings may also be used. The outer dipole magnet 20 is driven to rotate on its longitudinal axis by the outer dipole drive 46, represented in FIG. 1. The outer dipole drive 46 is a gear arrangement that transmits rotation by a drive shaft 48 from a drive motor 50. The drive motor 50 is located outside of the vessel 30 and the drive shaft 48 enters the vessel 30 through seals (not shown).

The net magnetic field exerted upon either of the magnetic beds 12 and 16 is the vector sum of the field of the respective inner dipole 14 or 18 in which the bed is positioned plus that field of the outer dipole magnet 20. Assuming that one of the inner dipole magnets 14 or 18 alone produces a magnetic field strength of B, and that the outer dipole magnet 20 produces a magnetic field of the same magnitude, the field of the inner dipole magnet and the outer dipole magnet 20 will align at some point of rotation of the outer dipole magnet 20 about its axis to produce a net field of 2B inside the inner dipole magnet. Exactly one-half rotation of the outer dipole magnet 20, the fields of the inner and outer dipole magnets are anti-aligned, and the net field inside the inner dipole magnet would be zero. Thus, the magnetic particle bed placed within each of the inner dipole magnets is magnetized and demagnetized upon rotation of the outer dipole magnet 20. FIG. 5 shows a schematic representation of an inner dipole producing a magnetic field and anti-alignment with the outer dipole magnet.

The inner dipole magnet 14 and the inner dipole magnet 18 are serially connected in opposition so that the field produced by one is in the opposite direction to that of the other. Therefore, when the outer dipole magnet 20 aligns with the field of the inner dipole magnet 14, it is simultaneously cancelling the field of the inner dipole magnet 18. This arrangement of inner and outer dipole magnets allows the magnetic flux enclosed by the magnets to remain constant, a necessary constraint for superconductors operating in the persistent mode, i.e. with the currents continuously circulating without the aid of a power supply. As explained further below, the two particle beds 12 and 16 operate exactly out of phase with each other. Thus, one of the two magnetic regenerative particle beds is rejecting heat to the hot sink while the other is absorbing heat from the cold source. This arrangement provides a more continuous and regulated cooling power.

The magnetic refrigerator 10 has connective plumbing that conveys a heat transfer fluid such as helium gas. Helium gas is a preferred heat transfer fluid for low temperature applications. As shown in FIGS. 1 and 2, a pipe segment 52 conveys the heat transfer fluid from the fluid displacer 28 to the hot heat exchanger 24; a pipe segment 54 conveys the heat transfer fluid from the hot heat exchanger 24 to the core of the first regenerative magnetic material bed 12; a pipe segment 56 conveys the heat transfer fluid from the core of the first regenerative magnetic material bed 12 to the cold heat exchanger 22; a pipe segment 58 conveys the heat transfer fluid from the cold heat exchanger 22 to the core of the second regenerative magnetic material bed 16; a pipe segment 60 conveys the heat transfer fluid from the core of the second regenerative magnetic material beds 16 to the hot heat exchanger 26; a pipe segment 62 conveys the heat transfer fluid from the hot heat exchanger 26 to the fluid displacer 28. Though the pipe segments 52, 54, 56, 58, 60, and 62 are separately identified, it is to be understood that the pipe segments 52, 54, 56, 58, 60, and 62 form part of a complete fluid circuit through which the heat transfer fluid is conveyed. Direction of flow of the heat transfer fluid through the circuit is determined by the fluid displacer 28. In the representation of FIG. 2, the fluid displacer 28 is a drive rod 64 and piston 66 arrangement within a cylinder 68. The fluid displacer 28 can be one of several possible designs such as one with noncontacting bearings, clearance seals, and linear induction drive. The fluid displacer 28 may be a mechanical piston with rubbing seals and contact bearings, a linear induction driven piston with non-contacting magnetic bearings and clearance seals, a magnetocaloric effect pump, or any other variety of gas-mover that has periodic flow. The displacer 28 may also be at room temperature with passive regenerators between the displacer 28 and the cryogenic hot heat exchanger. An additional element of the heat transfer system of the magnetic refrigerator 10 is an aluminum thermal bus 69 that connects the heat exchangers 24 and 26. The heat exchangers 22, 24, and 26 are high performance devices known in the cryogenic art.

In the operation of the magnetic refrigerator 10, the first magnetic material bed 12 is magnetized by the net magnetic field exerted by the first inner dipole magnet 14 and the outer dipole magnet 20, and the second magnetic material bed 16 is simultaneously demagnetized by the net magnetic field exerted by the second inner dipole magnet 18 and the outer dipole magnet 20. The first magnetic material bed 12 is magnetized and the second magnetic material bed is demagnetized with no gas flow. When the first magnetic material bed 12 is in the magnetized state, the magnetocaloric effect causes the average temperature of the first regenerative magnetic bed to increase. Simultaneously, the demagnetization of the material bed 16 causes the average temperature of the second regenerative magnetic bed 16 to decrease. Fluid is then forced by the fluid displacer 28 to be moved through the pipe 62 in the direction from the fluid displacer 28 toward the hot heat exchanger 26; through the pipe 60 in the direction from the hot heat exchanger 26 toward the second magnetic material bed 16, through the pipe 58 in the direction from the second magnetic material bed toward the cold heat exchanger 22; through the pipe 56 in the direction from the cold heat exchanger 22 toward the first magnetic material bed 12; through the pipe 54 in the direction from the first magnetic material bed 12 toward the hot heat exchanger 24; and through the pipe 52 in the direction from the hot heat exchanger 24 toward the fluid displacer 28. To effect flow in the direction just described, the piston 66 would be extended in the depiction of FIG. 2. Upon rotation of the outer dipole 20 on its longitudinal axis by the drive motor 50 through the dipole drive 46, the fields are reversed such that first regenerative magnetic material bed 12 is demagnetized and the second regenerative magnetic material bed 16 is magnetized. When the first magnetic material bed is in the in the demagnetized state, the magnetocaloric effect causes the average temperature of the second magnetic bed 16 to decrease. Simultaneously, the magnetization of the material bed 16 causes the temperature of the second magnetic bed 16 to increase. Fluid is then forced through the beds 12 and 16 in the opposite direction from that just described. To effect flow in this latter direction, the piston 66 would be retracted in the depiction of FIGS. 2 and 3. Thus, upon magnetization of any particular bed, fluid flow is forced therethrough in the direction from the cold heat exchanger 22 to a hot heat exchanger. Upon demagnetization of any particular bed, fluid flow is forced therethrough in the direction from a hot heat exchanger to the cold heat exchanger 22. Rotation of the outer dipole 20 is continuous and the magnetic fields of the first and second magnetic material beds 12 and 16 are out of phase such that when the magnetic field of the first magnetic material bed is peaking, the magnetic field of the second magnetic material bed 16 is ebbing, and vice versa. Upon continuous rotation of the outer dipole 20, intermediate magnetic fields will be created in the magnetic material beds 12 and 16 as the vector sum of the magnetic field of the outer dipole 20 is netted with the respective inner dipole magnet 14 or 18 and such vector sum continually changes upon rotation. When the magnetic field of one magnetic bed cycles to a peak and the other bed simultaneously ebbs, fluid flow in the piping is reversed. Fluid flow through the piping is therefore reciprocated by the fluid displacer 28.

Figure 7:
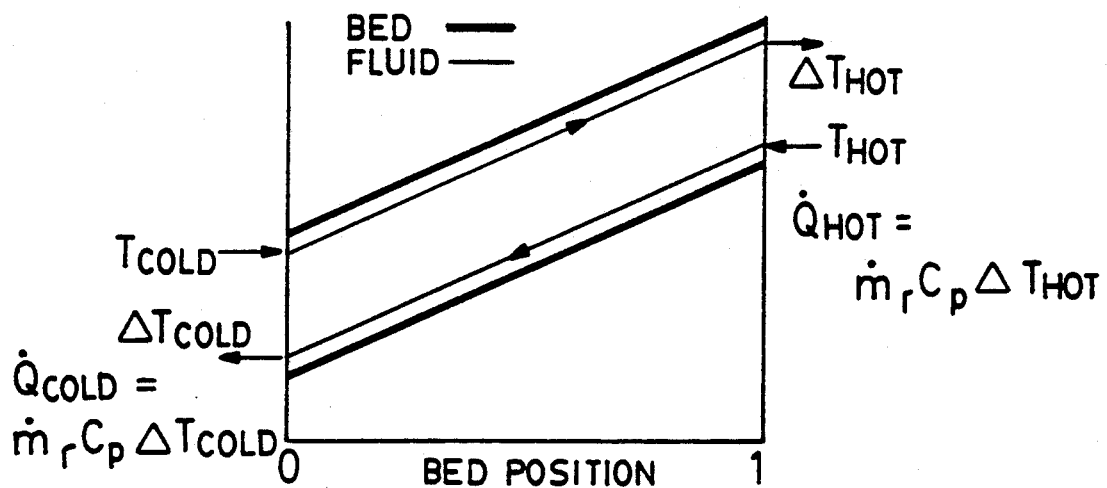
FIG. 7 is a temperature profile in a magnetic material bed that results from fluid flow from the cold heat exchanger to the hot heat exchanger after magnetization and from the hot heat exchanger to the cold heat exchanger after demagnetization.

FIG. 7 shows the temperature profiles that result in a particular magnetic material bed upon shuttling fluid from the cold heat exchanger to the hot heat exchanger upon magnetization and from the hot heat exchanger to the cold heat exchanger upon demagnetization. Assuming a very large thermal mass for the bed, as is typical, and steady operating conditions, the temperature in the packed bed varies with position on the temperature profile. When the bed is in the magnetized state, the magnetocaloric effect causes the average temperature of the bed to increase and follow the uppermost line of FIG. 7. The fluid is at a slightly lower temperature than the bed and thus absorbs heat from the bed, exiting at a temperature of $T_h + \Delta T_{hot}$. Circulating through the hot heat exchanger, the fluid rejects heat at the rate $\dot{Q}_h = \dot{m}_f C_p \Delta T_{hot}$, where $\dot{m}_f$ is the mass flow rate of the fluid, $C_p$ is the heat capacity of the fluid; the fluid temperature decreases to $T_h$. Upon demagnetization of the bed with no flow, its average temperature decreases due to the magnetocaloric effect and is described by the lowest line in FIG. 7. Fluid is then forced through the bed in the opposite direction. The fluid temperature is slightly higher than that of the bed, and heat is transferred from the fluid to the bed. The fluid exits the bed and enters the cold heat exchanger at a temperature $T_c - \Delta T_{cold}$. Circulating through the cold heat exchanger, the fluid absorbs heat $\dot{Q}_c = \dot{m}_f C_p \Delta T_{cold}$, its temperature increasing to $T_c$. The flow is stopped, the bed is again magnetized, and the cycle is repeated.

The description so far has presumed a magnetic refrigerator with low temperature applications, i.e., cooling below 10 K. FIGS. 1 and 2 additionally depict a first stage of a gas refrigerator 70 and a second stage of a gas refrigerator 72. The first stage of the gas refrigerator 70 provides cooling down to a range of 40-70 K., and the second stage of the gas refrigerator 72 cools to a temperature range of 15-30 K. The magnetic stage of the gas-magnetic hybrid refrigerator as accomplished by the magnetic refrigerator 10 may then cool, for example, down to 4 K. The foregoing system is particularly advantageous in cooling to low cryogenic temperatures, because all-gas cycle refrigerators are extremely inefficient at such very low temperature ranges. By combining gas cycle refrigerators 70 and 72, which allow medium cryogenic temperatures to be obtained, e.g., in the 15 K. to 30 K. range, with a magnetic refrigerator 10 utilized to provide refrigeration over the more limited range from 15-30 K. down to 2 K. to 6 K., improved efficiency is obtained. However, it is noted that multiple stages of magnetic refrigerators or cryogens such as liquid nitrogen could be utilized in place of the gas cycle refrigerators 70 and 72.

Though heretofore presumed to be used in low temperature applications, the magnetic refrigerator 10 as disclosed herein may also be used at intermediate and near room temperatures with certain modifications. For example, the material of the magnetic material beds would need to be choosen to have a ferromagnetic ordering temperature that would have the desired magnetocaloric effect at the desired temperature. Further, in lieu of helium gas as the preferred heat transfer fluid contained within the connective piping, other gases such as nitrogen, argon, and other heat transfer fluids are suitable at room temperature applications. Permanent dipole magnets may be substituted for superconducting dipole magnets peak for fields limited to $\approx 2T$. A suitable material for such a permanent dipole magnet is neodymium iron boron. Applications of the magnetic refrigerator and low temperatures include superconducting magnets, use in medical and laboratory instruments, and electronics and computers. For intermediate temperatures, the magnetic refrigerator may be used in MWIR coolers, HTSC applications, CMOS computers, cryopumps, hydrogen liquefiers, air separators, and liquefied natural gas plants. At near room temperature, applications include environmental control coolers, refrigerators, air conditioners, and heat pumps. The listing of potential uses of the rotary dipole active magnetic refrigerator of the present invention is intended to be illustrative and not exhaustive.

It is to be understood that certain modifications of the invention may be accomplished and yet be considered within the scope of the present invention. For example, instead of stationary inner dipoles and a rotating outer dipole, it would be possible to have a rotating inner dipole and stationary outer dipoles. Instead of two magnetic material beds, with certain structural modifications, the use of one may be possible, as would the use of three or more. It is therefore to be understood that the invention is not confined to the particular construction and arrangement of parts and method of operation described herein, but embraces all such modified forms thereof as come within the scope with the following claims.

What is claimed is:
1. A regenerative magnetic refrigerator comprising:
 (a) a magnetic material bed that is composed of a material subject to the magnetocaloric effect;
 (b) an inner dipole magnet directed along a longitudinal axis and producing a magnetic field transverse to the longitudinal axis, the magnetic material bed being positioned within the inner dipole magnet;
 (c) an outer dipole magnet directed along the longitudinal axis of the inner dipole magnet and the outer dipole magnet producing a second magnetic field transverse to the longitudinal axis, the inner dipole magnet being positioned within the outer dipole magnet and the inner and outer dipole magnets being rotatable with respect to one another to produce a net magnetic field upon the magnetic material bed that represents the sum of the magnetic field of the inner dipole magnet and the magnetic field of the outer dipole magnet, the net magnetic field peaking and ebbing as the position of the inner and outer dipole magnets rotate with respect to one another;

(d) means for rotating the inner and outer dipole magnets with respect to one another on the longitudinal axis;

(e) a hot heat exchanger that is connected to the magnetic material bed to transfer heat from the magnetic material bed when the net magnetic field is peaking; and (f) a cold heat exchanger that is connected to the magnetic material bed to transfer heat from the magnetic material bed when the net magnetic field is ebbing.

2. The regenerative magnetic refrigerator of claim 1 further comprising:

(a) a second magnetic material bed that is composed of a material subject to the magnetocaloric effect; and (b) a second inner dipole magnet directed along the longitudinal axis and producing a third magnetic field transverse to the longitudinal axis, the second magnetic material bed being positioned within the second inner dipole magnet and the second inner dipole magnet being positioned within the outer dipole magnet, the second inner dipole magnet and the outer dipole magnet being rotatable with respect to one another to produce a second net magnetic field upon the second magnetic material bed that represents the sum of the magnetic field of the second inner dipole magnet and the magnetic field of the outer dipole magnet, the second net magnetic field peaking and ebbing as the position of the second inner and outer dipole magnets rotate with respect to one another, and the first inner dipole magnet and the second inner dipole magnet having magnetic fields that are oriented transverse to the longitudinal axis such that the net magnetic field of the magnetic material bed is peaking while the second magnetic field of the second magnetic material bed is ebbing and the magnetic field of the magnetic material bed is ebbing while the second net magnetic field of the second magnetic material bed is peaking as the position of the inner dipole magnets and the outer dipole magnet rotate with respect to one another, wherein the means for rotating rotates the second inner dipole magnet and the outer dipole magnet with respect to one another on the longitudinal axis and wherein the hot heat exchanger is connected to transfer heat from the magnetic material bed and the cold heat exchanger is connected to simultaneously transfer heat from the second magnetic material when the net magnetic field is peaking and the second magnetic field is ebbing, and the hot heat exchanger is connected to transfer heat from the second magnetic material bed and the cold heat exchanger is connected to simultaneously transfer heat from the magnetic material bed when the net magnetic field is ebbing and the second net magnetic field is peaking.

3. The regenerative magnetic refrigerator of claim 1 wherein the inner and outer dipoles are superconducting.

4. The regenerative magnetic refrigerator of claim 3 wherein the windings of the dipoles are made of niobium-3 tin.

5. The regenerative magnetic refrigerator of claim 3 wherein the windings of the dipoles are made of niobium-titanium.

6. The regenerative magnetic refrigerator of claim 3 wherein the outer dipole is made of a permanent magnet material such as neodymium iron boron.

7. The regenerative magnetic refrigerator of claim 1 wherein the inner dipole is stationary and the outer dipole is rotatable.

8. The regenerative magnetic refrigerator of claim 3 wherein the dipoles are contained within a liquid helium bath.

9. The regenerative magnetic refrigerator of claim 3 wherein the dipoles are contained in helium gas and conductively cooled.

10. The regenerative magnetic refrigerator of claim 1 wherein the magnetic material bed is made of a rare earth intermetallic compound.

11. The regenerative magnetic refrigerator of claim 10 wherein the magnetic material bed is made of a ferromagnetic material.

12. The regenerative magnetic refrigerator of claim 1 wherein the magnetic material bed is made of a transition metal compound.

13. The regenerative magnetic material bed of claim 1 wherein the magnetic material bed is made of a material capable of highly efficient heat transfer.

14. The regenerative magnetic refrigerator of claim 1 wherein the hot and cold heat exchangers are connected to the regenerative bed by piping and heat transfer fluid is contained within the piping.

15. The regenerative magnetic refrigerator of claim 14 wherein the heat transfer fluid is gaseous helium.

16. The regenerative magnetic refrigerator of claim 14 wherein the heat transfer fluid is displaced through the magnetic material bed through the hot heat exchanger as the net magnetic field is peaking and the heat transfer fluid is displaced through the magnetic material bed through the cold heat exchanger as the net magnetic field is ebbing.

17. The regenerative magnetic refrigerator of claim 16 wherein the heat transfer fluid is displaced by a piston.

18. The regenerative magnetic refrigerator of claim 1 wherein the means for rotating is a drive motor.

19. The regenerative magnetic refrigerator of claim 1 wherein the regenerative magnetic refrigerator is enclosed within a vacuum vessel.

20. A regenerative magnetic refrigerator comprising:

(a) a first magnetic material bed that is composed of a material subject to the magnetocaloric effect;

(b) a first inner dipole magnet directed along a longitudinal axis and producing a magnetic field transverse to the longitudinal axis, the first magnetic material bed being positioned within the first inner dipole magnet;

(c) a second magnet material bed that is composed of a material subject to the magnetocaloric effect;

(d) a second inner dipole magnet directed along the longitudinal axis and producing a second magnetic field transverse to the longitudinal axis, the second magnetic material bed being positioned within the second inner dipole magnet;

(e) an outer dipole magnet directed along the longitudinal axis of the first inner dipole magnet the second inner dipole magnet, and the outer dipole magnet producing a third magnetic field transverse to the longitudinal axis, the first and second inner dipole magnets being positioned within the outer dipole magnet and the first inner dipole magnet and the outer dipole magnet being rotatable with respect to one another to produce a net magnetic field upon the magnetic material bed that represents the sum of the magnetic field of the inner dipole magnet and the magnetic field of the outer dipole magnet, the net magnetic field peaking and ebbing as the position of the first inner dipole magnet and the outer dipole magnet rotate with respect to one another, and the second inner dipole magnet and the outer dipole magnet being rotatable with respect to one another to produce a second net magnetic field upon the second magnetic material bed that represents the sum of the magnetic field of the second inner dipole magnet and the magnetic field of the outer dipole magnet, the second net magnetic field peaking and ebbing as the position of the second inner and outer dipole magnets rotate with respect to one another, and the first inner dipole magnet and the second inner dipole magnet having magnetic fields that are oriented transverse to the longitudinal axis such that the net magnetic field of the magnetic material bed is peaking while the second magnetic field of the second magnetic material bed is ebbing and the magnetic field of the magnetic material bed is ebbing while the second magnetic field of the second material bed is peaking as the position of the inner dipole magnets and the outer dipole magnet rotate with respect to one another;

(f) means for rotating the inner and outer dipole magnets with respect to one another on the longitudinal axis;

(g) a hot heat exchanger that is connected to the first and second magnetic material beds;

(h) a cold heat exchanger that is connected to the first and second magnetic material beds to transfer heat from the first and second magnetic material beds, wherein the hot heat exchanger is connected to transfer heat from the first magnetic material bed and the cold heat exchanger is connected to simultaneously transfer heat from the second magnetic material bed when the net magnetic field is peaking and the second magnetic field is ebbing, and the hot heat exchanger is connected to transfer heat from the second magnetic material bed and the cold heat exchanger is connected to simultaneously transfer heat from the first magnetic material bed when the first net magnetic field is ebbing and the second magnetic field is peaking.

21. The regenerative magnetic refrigerator of claim 20 wherein the inner and outer dipoles are superconducting.

22. The regenerative magnetic refrigerator of claim 21 wherein the windings of the dipoles are made of niobium-3 tin.

23. The regenerative magnetic refrigerator of claim 21 wherein the windings of the dipole are made of niobium titanium.

24. The regenerative magnetic refrigerator of claim 21 wherein the outer dipole is made of a permanent magnet material such as neodymium iron boron.

25. The regenerative magnetic refrigerator of claim 20 wherein the inner dipoles are stationary and the outer dipole is rotatable.

26. The regenerative magnetic refrigerator of claim 21 wherein the dipoles are contained within a liquid helium bath.

27. The regenerative magnetic material of claim 20 wherein the dipoles are contained in a helium gas and conductively cooled.

28. The regenerative magnetic refrigerator of claim 20 wherein the magnetic material beds are made of a rare earth intermetallic compound.

29. The regenerative magnetic refrigerator of claim 28 wherein the magnetic material beds are made of a ferromagnetic material.

30. The regenerative magnetic refrigerator of claim 20 wherein the magnetic material beds are made of a transition metal compound.

31. The regenerative magnetic refrigerator of claim 20 wherein magnetic material bed is made of a material capable of highly efficient heat transfer.

32. The regenerative magnetic refrigerator of claim 20 wherein the hot and cold heat exchangers are connected to the regenerative beds by piping and heat transfer fluid is contained within the piping.

33. The regenerative magnetic refrigerator of claim 32 wherein the heat transfer fluid is gaseous helium.

34. The regenerative magnetic refrigerator of claim 32 wherein the heat transfer fluid is displaced through the first magnetic material bed toward the hot heat exchanger as the first net magnetic field is peaking, through the second magnetic material bed toward the hot heat exchanger as the second net magnetic field is peaking, through the first magnetic material bed toward the cold heat exchanger as the first net magnetic field is ebbing, and through the second magnetic material bed toward the cold heat exchanger as the second net magnetic field is ebbing.

35. The regenerative magnetic refrigerator of claim 34 wherein the heat transfer fluid is displaced by a piston.

36. The regenerative magnetic refrigerator of claim 20 wherein the means for rotating is a drive motor.

37. The regenerative magnetic refrigerator of claim 20 wherein the regenerative magnetic refrigerator is enclosed within a vacuum vessel.

38. A method of magnetic refrigeration comprising the steps of:
(a) rotating a first magnetic field oriented transverse to a longitudinal axis about a magnetic material bed positioned within the longitudinal axis with respect to a second magnetic field oriented transverse to the longitudinal axis, the first and second transverse magnetic fields being vectorially summed to produce a net magnetic field cyclically peaking and ebbing upon rotation of the first and second magnetic fields, the magnetic material bed being made of a material subject to the magnetocaloric effect;
(b) transferring heat from the magnetic material bed to a hot heat exchanger when the net magnetic field is peaking; and
(c) transferring heat from the magnetic material bed to a cold heat exchanger when the net magnetic is ebbing.

* * * * *